Figure 3:
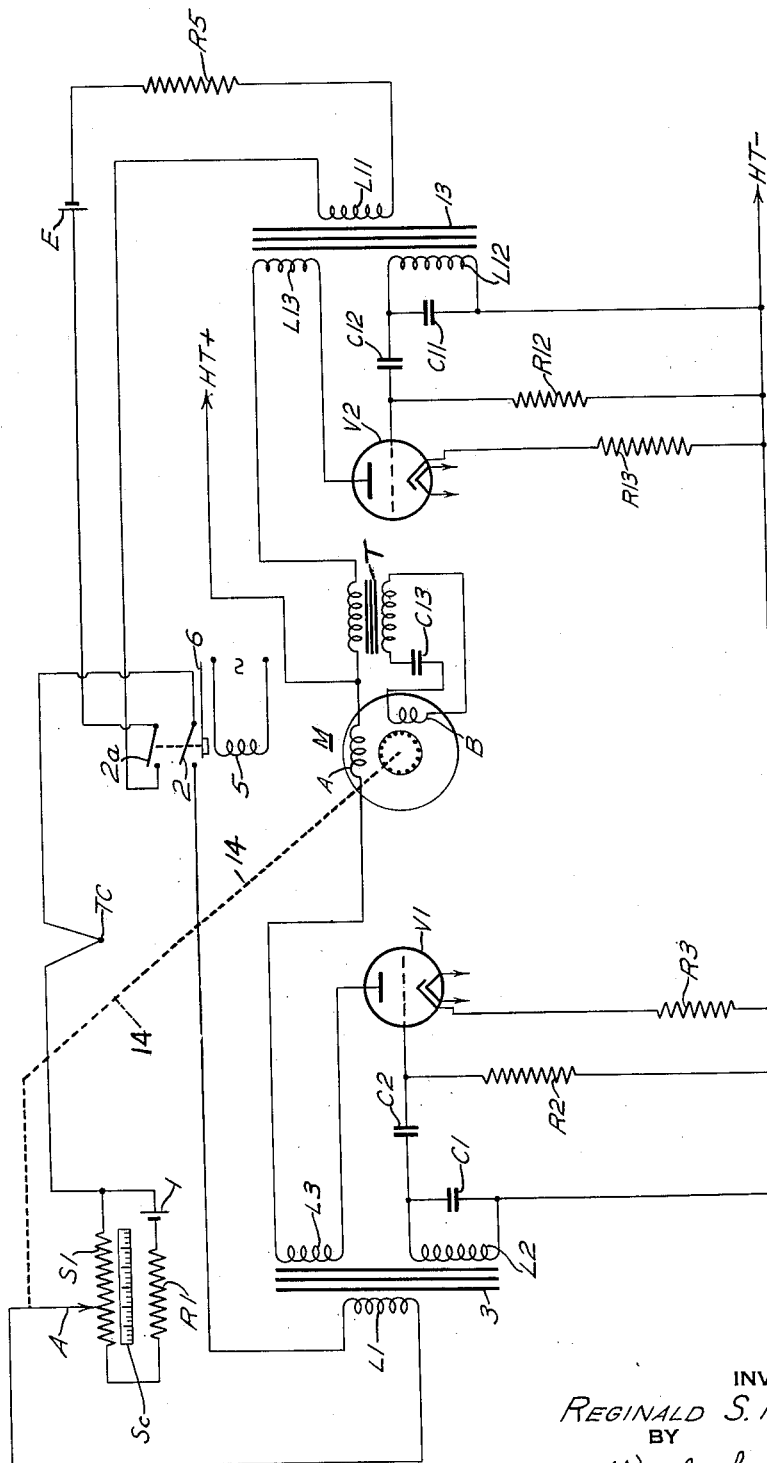

Feb. 19, 1952     R. S. MEDLOCK     2,586,686
OSCILLATOR-CONTROLLED REBALANCE MEASURING SYSTEM
Filed Feb. 24, 1947     4 Sheets-Sheet 1
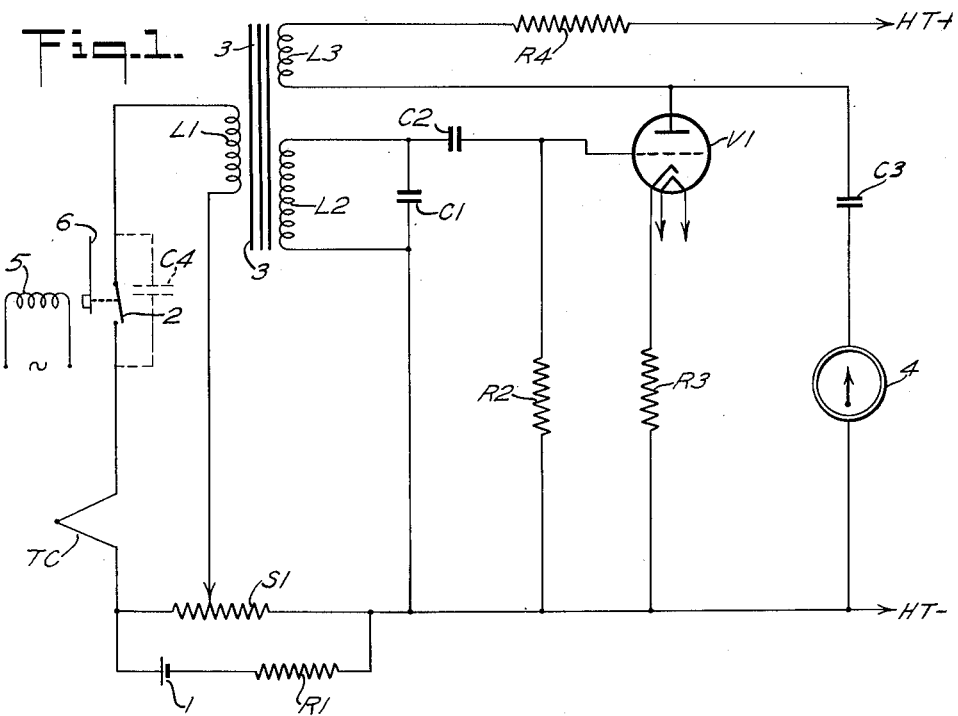
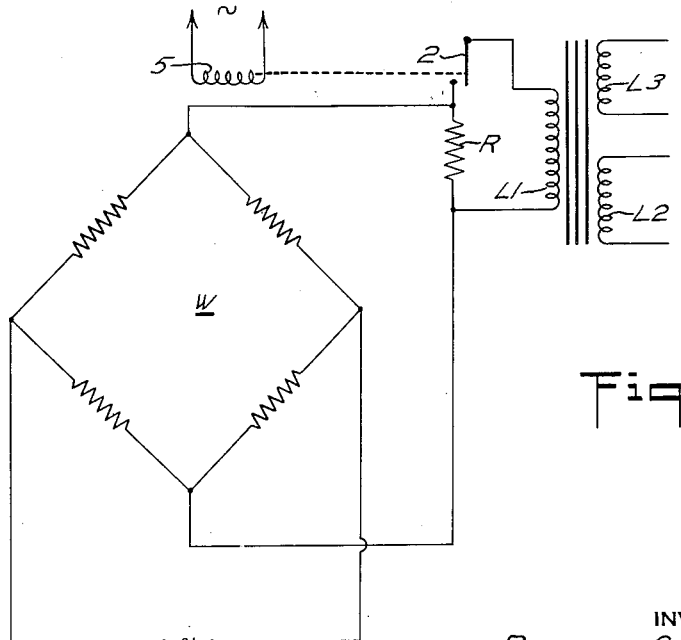
INVENTOR
REGINALD S. MEDLOCK
BY
Woodcock and Phelan
ATTORNEYS

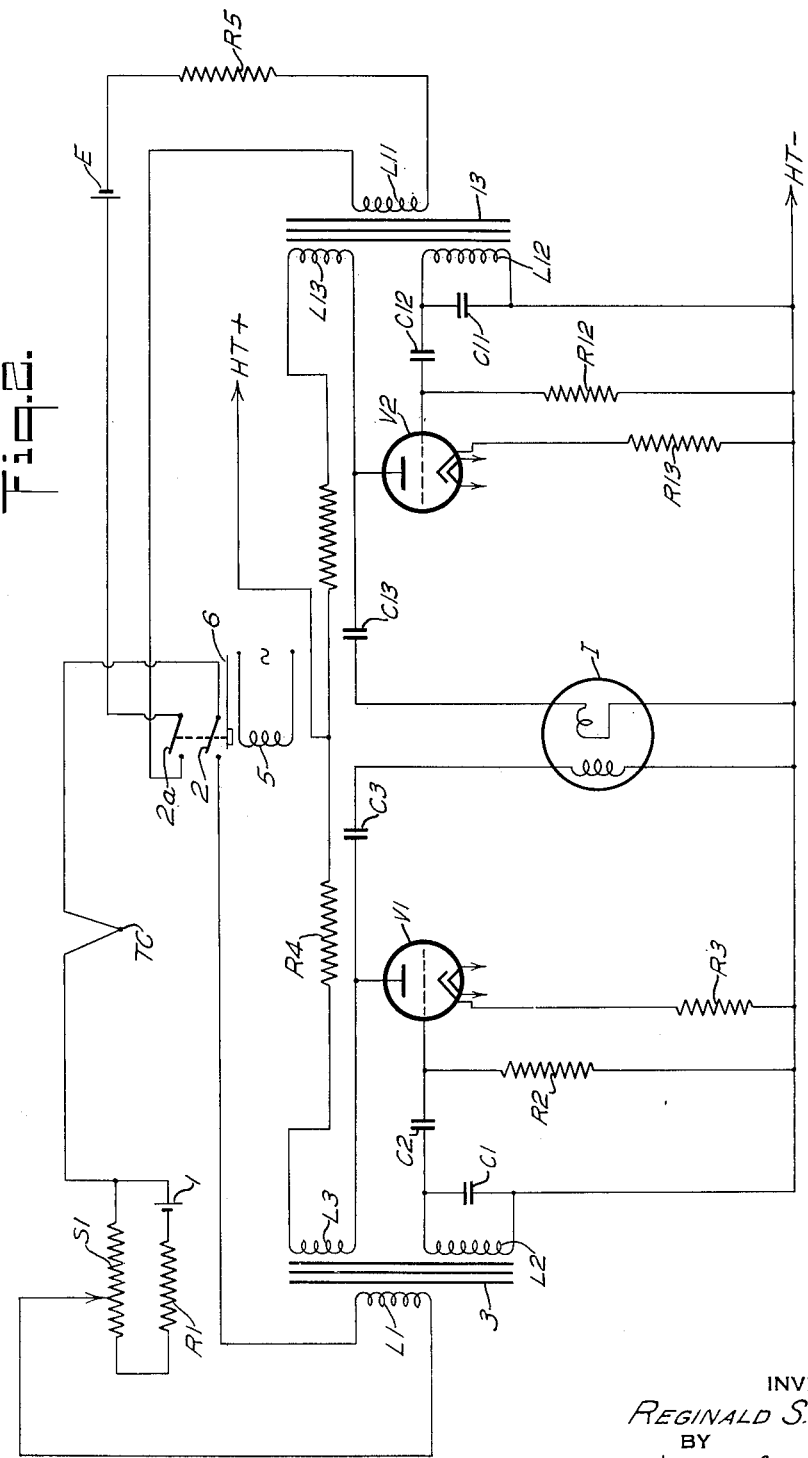

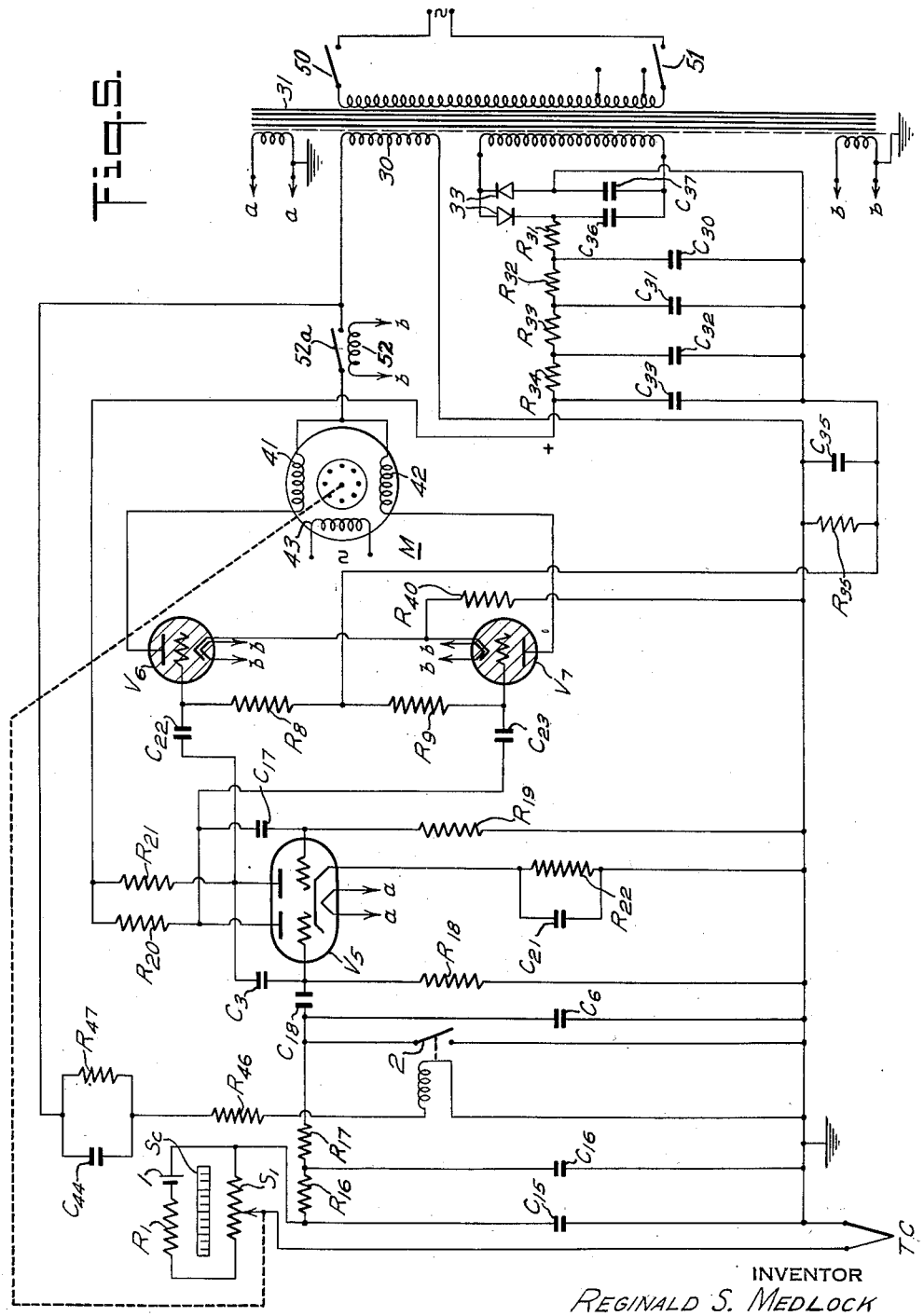

Patented Feb. 19, 1952

2,586,686

UNITED STATES PATENT OFFICE 2,586,686

OSCILLATOR-CONTROLLED REBALANCE MEASURING SYSTEM

Reginald Stuart Medlock, Luton, England, assignor to Leeds and Northrup Company, Philadelphia, Pa., a corporation of Pennsylvania Application February 24, 1947, Serial No. 730,523
In Great Britain March 7, 1946

10 Claims. (Cl. 171—95)

This invention relates to systems and methods of detection, measurement and amplification of small electro-motive forces or currents, and provides improved means, utilizing thermionic valve circuits for the performance of the method.

An object of the invention is to provide a means of detecting small D. C. or A. C. potentials or currents, such as those arising from the out-of-balance of Wheatstone bridge networks and potentiometers. Another aspect of the invention is the provision of means of amplifying the aforementioned potentials approximately in the ratio of their magnitude.

The invention finds particular useful application in the detection and measurement of small potentials or currents such as are obtained from thermocouples, bridge circuits, potentiometer networks and so forth.

As the electro-motive forces concerned may be of the order of one millivolt or less and may be of zero frequency, straightforward amplification by thermionic valves becomes a matter of great difficulty. To reduce this difficulty it has been proposed to interrupt the small out-of-balance potentials from bridges or potentiometers so as to convert a continuous current into a pulsating one. This simplifies the design of the thermionic valve amplifier. However, in order to obtain the required amount of amplification by this method several stages of amplification are often required.

The present invention utilizes a method capable of providing enormous amplification with only one valve, although the invention is not limited to the use of a single valve and may with advantage have two or more valves depending upon the application of the invention and the amplification required.

According to the invention, apparatus for the detection and measurement of small electrical potentials or currents includes a self-excited oscillation generator for generating oscillations of a given frequency, means for periodically interrupting the operation of said generator at another given frequency not exceeding and preferably below the frequency of said oscillations to cause said oscillation generator to produce pulses of oscillatory energy, means controlled by the potential or current to be detected or measured for regulating in accordance with its amplitude the rate at which oscillations build up to their maximum amplitude, and means for indicating the mean amplitude of the oscillatory energy in each pulse. The frequency of interruption of the circuit while below that of the oscillatory discharge is preferably well above any anticipated periodicity of fluctuations in the magnitude of the condition under measurement.

Also, in accordance with the invention, apparatus as set out in the immediately preceding paragraph, in which the phase of the oscillatory energy is shifted through 180° in response to a reversal of polarity of the potential or current to be detected or measured, includes a second self-excited oscillation generator for generating oscillations of said given frequency, means for periodically interrupting the operation of said second generator in synchronism with the interruption of the first mentioned oscillation generator to cause said second oscillation generator to produce pulses of oscillatory energy of constant phase, and a phase comparator to which pulses of oscillatory energy from both said oscillation generators are applied.

More broadly stated, the general principle of the invention can be outlined as follows:

A self-sustaining oscillatory circuit is allowed to burst into oscillation at periodic intervals; for example, for periods of 5 milliseconds every 20 milliseconds. For the remaining 15 milliseconds of each interval, the circuit is prevented from oscillating by an interrupter or a vibrating relay, which switches into the oscillating circuit a low impedance damping network or even a short circuit. The contacts of the vibrating relay are so connected that at the same instant, or within a very short space of time that the oscillator is free to oscillate, the E. M. F. to be detected is injected into one or more control grids of the oscillator valve or valves.

If the injected E. M. F. is zero, oscillations will still commence but the first half wave will be either positive or negative, dependent upon the polarity of any spurious E. M. F.'s developed by thermal agitation, "valve noise" or other random effects occurring in the oscillator circuit. These spurious E. M. F.'s are normally less than two microvolts, and hence it can easily be seen that the deliberate injection of a voltage exceeding two microvolts, and having a definite polarity, will always initiate the oscillations in a definite direction which will reverse when the polarity reverses.

It will be appreciated that, by switching the oscillator off and on at a fairly high periodicity, e. g. 50 times a second, detection of the polarity of the input E. M. F. is repeatedly made, and changes in polarity are quickly identified.

Experiments have shown that the following types of oscillating circuits can be applied to this invention:

(a) Tuned anode tuned grid; Hartley, Colpitts and other LC, that is, inductance-capacitance, oscillators of similar types.
(b) Multivibrators.
(c) Single valve resistance capacity oscillators, providing 180° phase shift between the grid and plate of the valve.
(d) Transitron or negative transconductance oscillators.
(e) Crystal and magnetostriction types of oscillators.
(f) Dynatrons.

In particular, the (a) and (b) types of oscillators have been given special study, and examples of each will be given.

It has been established that LC oscillators as opposed to relaxation oscillators are capable of giving outputs which not only change 180° in phase for a change in polarity of the input E. M. F., but which alter in magnitude according to a function of the magnitude of the input E. M. F. In this manner, enormous amplification of small E. M. F.'s is possible, utilizing only one thermionic valve.

For a more detailed explanation of the invention and for further objects and advantages thereof, reference is to be had to the following detailed description taken in conjunction with the accompanying drawings in which:

Fig. 1 diagrammatically illustrates a measuring system embodying one form of the invention;

Fig. 2 diagrammatically illustrates a measuring system embodying a different form of the invention;

Fig. 3 diagrammatically illustrates a measuring system embodying a still different modification of the invention;

Fig. 4 is a fractional wiring diagram which schematically illustrates an improvement which may be used with one or more of the other forms of the invention; and Fig. 5 diagrammatically illustrates a measuring system embodying a still different form of the invention.

Referring to Fig. 1, the invention in one form has been shown as including a battery 1 supplying current to a potentiometer made up of a slidewire S1 and a fixed resistance R1. The voltage from a thermocouple TC is connected in the circuit in series with a make and break switch 2 and a primary winding L1 of a transformer 3 so that the voltage of the thermocouple opposes that of the slidewire S1 in the normal manner.

The thermionic valve V1 is connected into a simple oscillating circuit which, for example, may have a natural frequency of 400 cycles/sec. Henceforth, it will be assumed that this is the chosen frequency. The oscillating circuit is of the tuned grid type comprising an inductance L2 in the form of a secondary winding on the transformer 3, a condenser C1 and an anode coupling coil L3 also forming a winding on the transformer 3. Condenser C2 and resistance R2 form a grid coupling circuit which limits the amplitude of the oscillations according to well established principles. The anode supply is indicated by HT+ and HT— while the filament supply may be from any suitable source.

Resistance R3 provides negative bias for the valve and provides a measure of negative feedback for improving the wave-form of the audio frequency output from the valve.

The output from the valve V1 is fed through a condenser C3 to a suitable indicator 4 which may be a moving iron, or rectifier type of moving coil instrument capable of detecting alternating current or voltage at the frequency generated by the oscillator. Resistance R4 together with L3 make up the anode load.

Switch 2 is operated by a coil 5 acting upon a reed 6. Coil 5 is supplied with an alternating current whose frequency is substantially less than that of the valve oscillator circuit (for example 50 cycles). In consequence switch 2 performs a make and break cycle at the same frequency as that of the current supplied to coil 5.

When switch 2 is closed, the impedance of the potentiometer and thermocouple circuit provides sufficient damping to prevent the valve circuit from maintaining its oscillations. When switch 2 is open, the damping is removed and the circuit is capable of building up oscillations limited in amplitude by the resistance R2 and condenser C2. The values of L3 and L2 and the mutual inductance between L3 and L2 are such that the natural rate at which oscillations build up is relatively slow.

If, however, an initiating impulse is delivered to the grid of V1 the oscillations will build up much more quickly. This state of affairs can arise when there is an out-of-balance potential between the thermocouple TC and the slidewire S1. The out-of-balance current passes through the primary winding L1 of the transformer, so that, when switch 2 is opened a voltage impulse is created in winding L2. This initiates rapid rise in amplitude of the oscillations in the valve circuit. The larger the impulse, the sooner the oscillations reach their maximum amplitude. Unless the out-of-balance voltage is particularly large, switch 2 usually closes and the oscillations cease before full amplitude is achieved.

When the out-of-balance is zero there is no initiating impulse and matters are so arranged that during the short period that switch 2 is open the oscillating circuit remains practically quiescent.

The periodic make and break of switch 2 can thus initiate pulses of 400 cycle oscillatory energy from V1. The mean amplitude of each pulse has been found experimentally to be dependent upon the value of the out-of-balance voltage.

Furthermore, and this is an important feature of the invention, the phase of the 400 cycle oscillations is shifted through 180° when the polarity of the out-of-balance voltage reverses.

This is because the initiating impulses on the grid of V1 will also be of reversed polarity and this will start the oscillator functioning in opposite phase.

With the simple circuit shown in Fig. 1 this phase reversal is not evident as the indicator is unaffected by a change in phase of 180°. Fig. 2 shows how the polarity of the out-of-balance potential may be indicated.

In Fig. 2, two oscillating circuits, similar to that of Fig. 1, are employed but with the difference that in one of the circuits a permanent source E of electro-motive force of fixed polarity is used in place of that in the other circuit provided by the thermocouple and potentiometer circuit. Both oscillators must have the same natural frequency, a matter easily arranged by known methods.

The output of valve V1 will consist of periodic pulses of 400 cycle oscillatory energy whose phase and energy-content is a function of the polarity and magnitude respectively of the out-of-balance voltage. The output from V2 will consist of periodic pulses of 400 cycle frequency of fixed phase and energy-content.

The two outputs can be fed into the two coils of a dynamometer or induction type of measuring instrument I of the center-zero type which will then indicate amplitude and polarity of the out-of-balance potential.

A double pole switch 2 and 2a is necessary in order to switch both halves of the circuit simultaneously. This is operated as before by an independent alternating current supply applied to the coil 5.

The out-of-balance potential produces current flow through primary winding L1 when switch 2 is closed. A current from a battery E of constant potential flows through the corresponding winding L11 of transformer 13 when switch 2a is closed. The switches 2 and 2a are mechanically linked so that they both open and close at the same instant. When closed, the resistances of the respective circuits in series with L1 and L11 are low enough to damp out any tendency for the valves V1 and V2 to oscillate. However, when switches 2 and 2a are opened, this damping is removed and oscillations at the natural frequencies of C1—L2 and C11—L12 begin, the frequency of the oscillations being the same in both circuits. The values of L3 and L2, and of L13 and L12 and the respective mutual inductance therebetween, are such that the natural rate at which the oscillations build up is relatively slow. When the initiating impulse is delivered to the grid of V1, the oscillations will build up much more quickly in the output circuit including condenser C3 and one winding of the indicating instrument I, as described in connection with Fig. 1. When the out-of-balance potential between the thermocouple TC and the potentiometer has the same polarity in sense as that of the battery E, then the currents flowing through the respective windings of the meter I will be in phase. However, when the polarity of the out-of-balance potential is reversed, then the polarity through the respective windings of the meter I will be out of phase. Accordingly, the meter I will be responsive to the direction or sense of unbalance as well as to its extent. The meter may be either of the conventional electro-dynamometer type or of the cross-coil type. In the first instance, the deflection will be dependent upon the product of the currents in the two windings; and in the second instance the deflection will be in accordance with the ratio of the currents in the two windings.

The invention also covers similar circuits in which L2 and L3 are closely coupled, thus allowing V1 to oscillate at maximum amplitude immediately switch 2 is opened. In circuit arrangements of this kind the magnitude of the output will be virtually independent of the magnitude of the input but there will be a sharp phase reversal in the output with a reversal of polarity of the input. A circuit operating in this manner as a self-balancing potentiometer is illustrated in Fig. 3 in which a potentiometric system made up from S1, R1, and a battery 1 is used to measure the potential of a thermocouple TC.

The out-of-balance potential produces current flow through primary winding L1, when switch 2 is closed. A current from a battery E of constant potential flows through the corresponding winding L11 of transformer 13 when switch 2a is closed. Both switches 2 and 2a are mechanically linked so that they both open and close at the same instant.

When switches 2 and 2a are both closed the resistances of the circuits in series with L1 and L11 are sufficiently low to damp out any tendency for the valves V1 and V2 to oscillate.

Immediately the switches are opened this damping is removed and V1 and V2 start oscillating at the same frequency because the natural resonant frequencies of C1, L2 and C11, L12 are identical.

When the out-of-balance potential between the thermocouple TC and the potentiometer has the same polarity and sense as that of the battery E then V1 and V2 will oscillate in phase.

When the polarity of the out-of-balance potential is reversed then the oscillations from V1 and V2 will be in antiphase.

Switches 2 and 2a may, for example, be operated at a frequency of 50 cycles per second and the valves V1 and V2 may oscillate at 400 cycles/sec.

Other frequencies are possible but it will be assumed that 50 and 400 cycles are the values used in this particular example.

The output power from V1 and V2 is fed into a small induction motor M capable of operating at a frequency of 400 cycles/sec.

This motor has two windings A and B. Winding A is in the anode lead of V1, and consequently can receive D. C. and A. C. current through its windings. The other winding B is connected, via an output transformer T, to the valve V2. A condenser C13 is connected in series with winding B to produce a current which is approximately in quadrature with that in A.

When the oscillations from V1 and V2 are in phase the motor will run in one direction and when they are in reverse phase or antiphase the motor will run in the reverse direction.

The purpose of connecting winding A in the anode lead of V1, is to provide a measure of dynamic braking. It is well known that a D. C. current in the winding of an induction motor provides a braking torque due to eddy current generation.

Now when V1 is oscillating at its maximum amplitude, the anode current is at a minimum value and the braking effect is very small.

When the out-of-balance electro-motive forces approaches zero the amplitude of the 400 cycle oscillations from V1, approaches zero and the anode current rapidly rises thus effectively braking the speed of the motor as the balance point is reached.

The drive from the motor is connected, through suitable means 14 indicated by the broken line and which may include gearing, to the slidewire contact arm A operating on S1. The direction of motion of this contact arm is arranged to reduce the out-of-balance electro-motive forces between the thermo-couple and potentiometer and eventually to reduce it to zero at which point the motor stops.

A pointer can be connected to the slidewire contact to indicate on a scale Sc the temperature corresponding with the electro-motive force of the thermocouple in the ordinary manner.

In order to prevent overshooting of the slide-wire contact due to inertia of the motor parts a small D. C. generator can be attached to the driving spindle of the motor. The output of this generator or portion thereof can be fed back in series opposition to the out-of-balance voltage from the thermocouple and the potentiometer. This feedback will be a function of the speed of the motor and will reverse its polarity when the motor reverses in direction.

If the output of the generator is fed back in the correct sense it will tend to slow down the motor before the balance point is reached and thus prevent "overshooting" or "hunting." This stabilizing device, together with others, are well known and do not need further description; see for example U. S. Patent to Williams No. 2,113,164.

Valve V1 may be a triode, tetrode, pentode or other multiple grid valve and the oscillating circuit may be any one of the well known types. In Fig. 2, V1 and V2 may be combined in a single glass envelope and form the two halves of a double triode valve.

It should also be understood that the output of V1 and V2 may be fed to other valve stages to get increased amplification or to provide a buffer stage between the oscillator circuit and the output circuit.

By connecting a small condenser C4 across the contacts as shown dotted in Fig. 1, increased sensitivity may be obtained.

The frequency applied to relay coil 5 may be of any suitable value provided it does not exceed the natural frequency of the L2C1 oscillating circuit.

When the out-of-balance potential is alternating as might be the case with a Wheatstone bridge $w$ fed from an alternating current supply the input circuit arrangement is shown as in Fig. 4. In this arrangement the same alternating supply is used to feed both the bridge circuit and the relay vibrator coil 5.

In this circuit, the contacts of the switch 2 are operated as before by relay coil 5. In one position the relatively low impedance of the bridge circuit $w$ with or without resistance R provides damping of winding L1 and prevents oscillation, and in the other position, L1 is open circuited and oscillations commence, initiated by the instantaneous polarity of the out-of-balance potential across the bridge. It is essential that the same alternating current supply is fed to the bridge circuit as to the relay coil 5, and for optimum sensitivity the break of the switch contacts should occur at approximately peak amplitude of the A. C. wave. This can be achieved by adjusting the phase of the current through the relay coil 5 in conventional manner.

Another form of the invention will now be described, utilizing the same principles but as applied to a relaxation oscillator of the multivibrator type. This form is particularly suitable for two position temperature control, using a thermocouple or resistance thermometer as the measuring element. The circuit is equally suitable for resistance thermometers in either D. C. or A. C. fed bridges.

Fig. 5 shows a suitable circuit. In a typical arrangement, thermocouple TC measures the temperature of a furnace (not shown), and the E. M. F. developed by the thermocouple is balanced against a potential developed by a potentiometer including a slidewire S1.

The difference in E. M. F. between the thermocouple and potentiometer is applied to the grid circuit of a multivibrator oscillator through a filter, incorporating resistances R16—R17 and capacities C15—C16, which filters out stray alternating and "pick up" E. M. F.'s.

The multivibrator is made up of a valve V5 which, for convenience, may be of the double triode type, grid leaks R18—R19, grid coupling condensers C17—C18, anode resistances R20—R21, and cathode resistance R22 and by-pass condenser C21. Its anode supply is obtained from rectifiers 33 and a filter consisting of resistors R31—R34 and capacitors C30—C33.

A relay having contacts 2 is energized by a 50 cycle A. C. supply, although other frequencies are also possible. The relay contacts 2 periodically make and break at the frequency of the supply, viz. 50 times a second. It also has a phase-control network comprising resistances R46 and R47 and a condenser C44. When contacts 2 are open, the multi-vibrator circuit oscillates at a frequency which is dependent on the resistance capacity values in the circuit. The actual frequency of oscillation is not important over fairly wide limits, but a frequency of 5,000 cycle per second has been found to yield good results.

When the contacts 2 are closed, the oscillations are by-passed via condenser C18 to earth, and the circuit becomes quiescent, whilst the out-of-balance E. M. F. becomes short circuited. However, when the contacts open, the out-of-balance E. M. F. is re-established across them, and is injected, via C18, into the left-hand grid circuit of V5. This initiates oscillations, resulting in the grid at first being driven either positive or negative, dependng upon the polarity of the out-of-balance potential.

If we assume that the out-of-balance E. M. F. is positive, then the grid will be driven positive and the associated anode will be driven more negative. The second anode will simultaneously be driven more positive. Thus the grid of gas-filled relay V6 will receive a positive pulse through condenser C22 and the grid of V7 will receive simultaneously a negative pulse through C23. The relays V6 and V7 may be grid-controlled arc rectifiers.

Conventional circuit components have been illustrated in Fig. 5 including line switches 50 and 51 which when closed energize the power transformer 31. The filament connections are indicated by the letters $a,a$ and $b,b$. It will be observed coil 52 of a relay is connected to the transformer winding as indicated by the letters $b,b$ and that the relay contact 52a is closed upon energization of transformer 31.

The anodes of V6 and V7 are supplied with a 50 cycle alternating voltage from winding 30 of the transformer 31. A steady negative D. C. bias is applied to the grids of V6 and V7 by means of the resistance R35 and by-pass condenser C35 which are connected in the negative side of the high tension supply to the anodes of V5. This bias is sufficient to prevent V6 and V7 igniting, unless a large positive pulse is applied to their grids. When the pulses from the multivibrator anodes reach the grids of V6 and V7, it is arranged for the anodes of V6 and V7 to be positive and hence, for the conditions assumed above, V6 will strike or become conductive, to energize one coil 41 of motor M, and also establish a positive potential across the common cathode resistance R40. This positive potential will bias the grid of V7 to a sufficiently high negative potential that subsequent oscillations from V5 will be unable to trigger V7, or have any further effect during the half cycle in which the anodes of V6 and V7 are positive.

The relay having contacts 2 then damps out the oscillations of V5 by closure of the contacts 2. V6 will continue to conduct until the anode voltage drops back to zero, and both V6 and V7 will remain extinguished until the next positive half wave is impressed upon their anodes, together with the required positive pulse on one of the grids.

The above operation will be repeated fifty times a second, whilst the out-of-balance is positive, but if it should change to a negative value, V6 will ignite or become conductive at each half wave instead of V7.

The coil 41 or the coil 42 of a reversing motor M will then be energized depending upon whether V6 or V7 ignites, which in turn depends upon whether the temperature of the thermocouple is above or below the then existing setting of the slidewire S1 of the potentiometer. Thus the motor will drive the slidewire S1 in the potentiometer network in a direction which balances the E. M. F. from the thermocouple, and thus provides a self-balancing temperature measuring instrument as previously described.

While embodiments of the invention have been described, it will be understood that further modifications may be made within the spirit and scope of the appended claims.

I claim:

1. A system for measuring an electrical quantity not readily amplifiable, comprising a self-excited oscillation generator for generating oscillations of a given frequency, means for periodically interrupting the operation of said generator at another given frequency below the frequency of said oscillations and above anticipated fluctuations of said quantity to cause said oscillation generator cyclically to produce pulses of oscillatory energy, means responsive to change in said electrical quantity for controlling in accordance with change in its amplitude the rate at which oscillations build up to their maximum amplitude and for shifting the phase of the oscillatory energy through 180 degrees in response to a reversal of polarity of said electrical quantity, a second self-excited oscillation generator for generating oscillations of substantially the same frequency as said first-named given frequency, means for periodically interrupting the operation of said second generator at the frequency of interruption of oscillations of said first-mentioned oscillation generator for producing pulses of oscillatory energy of constant phase, and means jointly responsive to the pulses of oscillatory energy from both of said oscillation generators for indicating the direction and extent of change of said electrical quantity.

2. A system for measuring an electrical quantity of a character which is not readily amplifiable, comprising a self-excited oscillation generator for generating oscillations of a given frequency, means for periodically interrupting the operation of said generator at a frequency below the frequency of said oscillations for producing pulses of oscillatory energy from said oscillation generator, a balanceable network unbalanced by change in said electrical quantity, means responsive to unbalance of said network for changing the phase of the oscillatory energy through 180 degrees in response to departure of said network balance from one direction to the opposite direction, a second self-excited oscillation generator for generating oscillations of said first-named frequency, means for periodically and simultaneously interrupting the operation of said second generator at the frequency of interruption of oscillations of said first-mentioned oscillation generator for producing pulses of oscillatory energy of constant phase, and means jointly responsive to the pulses of oscillatory energy from both of said oscillation generators for indicating the direction and extent of change of said electrical quantity.

3. A system for measuring an electrical quantity of a character which may not be readily amplified, comprising a self-excited oscillation generator for generating oscillations of a given frequency, means for periodically interrupting the operation of said generator at a frequency below the frequency of said oscillations for producing pulses of oscillatory energy from said oscillation generator, a balanceable network unbalanced by change in said electrical quantity, means for balancing said network, means responsive to unbalance of said network for reversing the phase of the oscillatory energy with change in sign of unbalance of said network, a second self-excited oscillation generator for generating oscillations of said first-named given frequency, means for periodically and simultaneously interrupting the operation of said second generator at the frequency of interruption of oscillations of said first-mentioned oscillation generator for producing pulses of oscillatory energy of constant phase, and means jointly reponsive to the pulses of oscillatory energy from both of said oscillation generators for operating said network balancing means in a direction to balance said network thereby to indicate extent of change of said electrical quantity.

4. A system for measuring an electrical quantity of a character which may not be readily amplified, comprising a self-excited oscillation generator for generating oscillations of a given frequency, means for periodically interrupting the operation of said generator at a frequency below the frequency of said oscillations for producing pulses of oscillation energy from said oscillation generator, a balanceable network unbalanced by change in said electrical quantity, means for balancing said network, means responsive to unbalance of said network for reversing the phase of the oscillatory energy with change in sign of unbalance of said network, a second self-excited oscillation generator for generating oscillations of substantially the same frequency as said first-named given frequency, and means responsive to oscillatory energy from both of said oscillation generators for operating said network balancing means in a direction to balance said network thereby to indicate the extent of change of said electrical quantity.

5. A system for measuring electrical quantities, comprising a self-excited oscillation generator for generating oscillations, an output circuit for said generator, an input circuit for said generator including a balanceable network having condition-responsive means for unbalancing the network in accordance with change in the magnitude of a condition, a periodically operable circuit controller for first changing the connections of the input circuit to suppress oscillation of said generator, and for then changing the connections of said input circuit to develop in said input circuit said unbalance in the form of a pulse whose magnitude is a function only of the magnitude of said unbalance existing when said circuit-controller changes said connections for developing in said output circuit pulses of oscillatory energy related in magnitude to the magnitude of the applied pulses, and means included in said output circuit responsive to the amplitude of the oscillatory pulses developed therein.

6. A system for measuring electrical quantities, comprising a self-excited oscillation generator for generating oscillations at a predetermined frequency, an output circuit for said generator, an input circuit for said generator including a balanceable network having condition-responsive means for unbalancing the network in accordance with change in the magnitude of a condition, a periodically operable circuit-controller for first changing the connections of the input circuit to suppress oscillation of said generator, and for then changing the connections in said input circuit to develop in said input circuit said unbalance in the form of a pulse whose magnitude is a function only of the magnitude of said unbalance existing when said circuit-controller changes said connections and whose phase is dependent upon the direction of unbalance of said network, whereby the periodic application of the pulses controls in accordance with their polarity the phase with which the oscillations of said generator are initiated, and means in said output circuit operable both in response to the phase and to the amplitude of said oscillations.

7. A system for measuring electrical quantities, comprising a self-excited oscillation generator for generating oscillations at a predetermined fixed frequency, an output circuit for said generator, an input circuit for said generator, including a balanceable network having impedance elements and condition-responsive means for unbalancing the network in accordance with change in the magnitude of a condition, a periodically operable circuit-controller for alternately changing the connections of said input circuit to suppress oscillation of said generator and for changing said connections for applying the difference between the unbalance of said network and zero unbalance for production of periodic pulses, each of which initiates oscillation of the oscillator with an amplitude dependent upon the extent of unbalance of said network, and means operable in accordance with the amplitude of the oscillatory energy developed in said output circuit.

8. A system for measuring electrical quantities, comprising a self-excited oscillation generator for generating oscillations, an output circuit for said generator, an input circuit for said generator, including a balanceable network having impedance elements and condition-responsive means for unbalancing the network in accordance with change in the magnitude of a condition, a periodically operable circuit-controller for alternately changing the connections in said input circuit to suppress oscillation of said generator and for changing said connections for applying the difference between the unbalance of said network and zero unbalance for production of periodic pulses, each of which initiates oscillation of the oscillator with an amplitude dependent upon the extent of unbalance of said network and the direction of whose first oscillation is dependent upon the direction of unbalance of said network, and means operable both in response to the phase of said oscillations as determined by the direction of said first oscillation and to the amplitude of said oscillations for indicating the direction and extent of unbalance of said network.

9. A system for measuring electrical quantities, comprising a self-excited oscillation generator for generating oscillations, an output circuit for said generator, an input circuit for said generator including a balanceable network having condition-responsive means for unbalancing the network in accordance with change in the magnitude of a condition, a periodically operable circuit-controller for changing the impedance of the input circuit to suppress oscillation of said generator, and for then changing the impedance of said input circuit and to apply thereto said unbalance to develop in said input circuit said unbalance in the form of a pulse whose magnitude is a function only of the magnitude of said unbalance existing when said circuit-controller develops said pulse and whose phase is dependent upon the direction of unbalance of said network, whereby the periodic application of the pulses controls in accordance with their polarity the phase with which the oscillations of said generator are initiated, and means operable in response to the phase of said oscillations for rebalancing said network.

10. A system for measuring electrical quantities, comprising a self-excited oscillation generator for generating oscillations, an output circuit for said generator, an input circuit for said generator including a balanceable network having impedance elements and condition-responsive means for unbalancing the network in accordance with change in the magnitude of a condition, said generator having a control grid disposed between an anode and a cathode, said input circuit being connected between said grid and said cathode, a periodically operable circuit controller in one circuit-controlling position connecting said grid to said cathode to suppress oscillation of said generator and in the other circuit-controlling position for developing in said network a pulse whose magnitude is related to the unbalance of said network as compared with zero to initiate oscillation of the oscillator with an amplitude dependent upon the extent of unbalance of said network and with a polarity of the first oscillation thereof dependent upon the direction of unbalance of said network, and means including said output circuit operable in one direction or the other depending upon the polarity of said first oscillation for rebalancing said network, the periodicity of operation of said circuit-controller being less than the frequency of oscillation of said generator.

REGINALD STUART MEDLOCK.

REFERENCES CITED

The following references are of record in the file of this patent:

UNITED STATES PATENTS

| Number | Name | Date |
|---|---|---|
| 1,687,933 | Farrington | Oct. 16, 1928 |
| 2,027,828 | Knight | Jan. 14, 1936 |
| 2,203,689 | MacDonald | June 11, 1940 |
| 2,212,202 | Faudell et al. | Aug. 20, 1940 |
| 2,228,163 | Cohen | Jan. 7, 1941 |
| 2,338,395 | Bartelink | Jan. 4, 1944 |
| 2,423,617 | Roth | July 8, 1947 |